United States Patent [19]

Lydon et al.

[11] 4,058,884

[45] Nov. 22, 1977

[54] AUTOMATIC SCREW DRIVER SYSTEM AND METHOD FOR UTILIZING SAME

[76] Inventors: Ralph P. Lydon, 2616 N. 75th St., Wauwatosa, Wis. 53213; William A. Weismueller, Sr., Rte. 1, Box 29, Oostburg, Wis. 53070

[21] Appl. No.: 733,287

[22] Filed: Oct. 18, 1976

[51] Int. Cl.$^2$ .................... B25B 23/08; B23P 19/06
[52] U.S. Cl. ........................... 29/526 R; 29/240; 144/32 R
[58] Field of Search .................. 144/32; 29/240, 526, 29/428; 81/54, 57.44; 145/51

[56] References Cited

U.S. PATENT DOCUMENTS

| | | | |
|---|---|---|---|
| 2,499,708 | 3/1950 | Whitledge | 144/32 X |
| 2,565,505 | 8/1951 | Lamb | 144/32 |
| 2,570,164 | 10/1951 | Shaff | 144/32 |
| 3,168,128 | 2/1965 | Steadle, Jr. | 144/32 |

FOREIGN PATENT DOCUMENTS 447,839  5/1947  Italy .................... 145/51

*Primary Examiner*—Milton S. Mehr
*Attorney, Agent, or Firm*—Alter and Weiss

[57] ABSTRACT

An improved pneumatically operated automatic screw driver system for affixing screw devices into objects. The inverted screw-driving system utilizes a locator guide and locator to pre-position and align a screw device relative to the object that is being driven into. Drawing the object against the locator and the pre-positioned screw automatically imparts rotation to the aligned screw even before contact is made between the screw and the object. The construction of the locator and locator guide is such to absorb the initial torque developed by the driver, and the locator is spring-loaded within the locator guide so as to maintain the driver in the operably "off" position until the locator guide is depressed to activate the air motor and thus rotate the screw device.

11 Claims, 4 Drawing Figures

AUTOMATIC SCREW DRIVER SYSTEM AND METHOD FOR UTILIZING SAME

BACKGROUND OF THE DISCLOSURE

This invention relates in general to screw-fastening devices and more particularly to an automatic pneumatically powered screw-driving apparatus which locates a screw prior to driving and initiates rotation of the screw before contact is made with the object into which it is being driven.

To date, screw alignment and driving tools exist for use in repetitive production processes which make the starting and driving of the screw by hand totally unfeasible. The majority of the conventional devices comprise suspended, pneumatic, automatic screw drivers, as well as inverted screw drivers. These automatic screw drivers suspend from their air power conduit over a work area and are then placed over a screw once it has been started into an object to complete the driving of the screw into the object. Normally, the driver action is initiated by suppressing a switch either on the tool itself, or on the floor closely proximate to the user's work area. Conventional inverted automatic screw drivers attached to a workbench have similarly been used.

While these types of conventional screw-driving apparatus are in great supply, there is often associated with them the problem of initially aligning and setting the screw with the object into which it is to be driven. Additionally, it is often difficult to impart to the screw the much-desired initial torque before contact is made between the screw and the object into which it is being driven. Obviously, the conventional overhead pneumatic screw driver, or inverted screw drivers which are capable of driving the screw only after it has been started, ecounter great difficulty in aligning and starting the screw itself, as well as great difficulty in imparting and absorbing initial torque to the screw before contact is even made between the screw and the object.

It is thus an object of the present invention to effectively locate a screw device relative to an object into which it will be driven in an improved manner and to maintain this location until the screw is formally set and driven into the object.

It is additionally an object of the present invention to enable the user of the automatic screwing system to apply a preliminary torque to the screw even before the screw makes contact with the object into which it will be driven, and to actuate this initial "pre-contact" preliminary torque automatically when the object is brought into contact with the system at a certain predetermined distance, while at the same time absorbing this torque more efficiently.

It is also an object of the present invention to enable a pre-determined depth of drive which is adjustable so as to make sure for the user that the screw is affixed to the object through an appropriate distance so as to minimize the error arising when the user himself must judge the appropriate depth to which the screw must be driven.

In addition to this convenience, the present invention seeks to provide more convenience for the user by providing a compact, efficient work area tool, accurate in performing its job, while providing the user a convenient mounting apparatus not only for the tool itself, but also for bins which contain the necessary screw devices with which the user is performing the setting and driving operations.

Further, it is an object of the present invention to provide a safe, efficient screw setting and driving apparatus which reduces the exposure of moving parts when the apparatus is operating or not in use, all on an efficient, convenient apparatus which can be quickly and easily attached to and in the user's work area.

These and other aspects of the invention will become apparent from the ensuing specification and drawings.

SUMMARY OF THE INVENTION

The present invention is an automatic air-operated screw driving system comprising an air-operated motor which is coupled to a screw-device drive, extending from the motor to the head of a screw device for the purpose of driving the screw device into an object brought into contact with the screw driving system. Locator means are radially dispersed about the driver at the driver's tip for the purpose of aligning and fixedly restraining the positions of the driver relative to the screw device, as well as the driver and screw device relative to the subject into which the screw device is being driven. Further, the locator means has means for distributing the torque applied to the object when said screw is driven into the object.

The invention comprises means for activating the rotation of the motor so as to impart rotation to the driver and the screw device, for the insertion of the screw device into the object.

The screw driving system includes attachment means for attaching the screw driving apparatus itself to a work bench whereby the motor means and its projecting driver, as well as the locator means are restrained relative to one another. The attachment means comprise a substantially "C"-shaped bracket with the lower member of the bracket comprising a motor attachment member which supports a pneumatically powered means. The vertical middle section of the "C"-shaped bracket comprises the mounting member for the screw driving system and includes mounting apertures for attachment of the screw driving system to a work piece or fixture. The upper horizontal member of the substantially "C"-shaped bracket comprises the locator support member which locates and restrains in position the locator means through which the driver, projecting from the motor means, protrudes. Still yet in this preferred embodiment there is provided means on the upper horizontal member of the "C"-shaped bracket, (the locator support member) from which part bins are fabricated to suspend. On the inverted automatic screw driver system of the type herein disclosed, the efficiency and productivity of a user is greatly increased when the screw devices and objects onto which they will be attached are brought into convenience proximity to the user through the use of such part bins.

While the several different types of powered motor means may be usable in the screw driver system of the type herein disclosed, the preferred embodiment of the invention calls for the use of a pneumatically powered motor having external torque adjustment clutch means and thereby offers to the user flexibility of driving screws into objects under a desired torque.

The locator means discussed previously comprises a substantially square-shaped elongated locator having an upper and lower end. The locator has an apertured center throughout its length along its elongated axis into which the driver means projecting from the motor passes. The tip of the driver remains positioned within the aperture internal to the locator itself. Additionally, the upper end of the locator is counter-bored to receive the end of the screw device and restrain the inverted screw device in position closely proximate to the tip of the internally protruding driver means. The locator is telescopically received in a substantially cylindrical shaped locator guide, having an internal cavity substantially equivalent to the shape of the locator so that the locator can move in a substantially vertical up-or-down path in a sliding fashion. The locator is spring loaded within this locator guide so as to protrude outwardly when idle. The internally positioned spring seats at one end in the locator and at its other end proximate to the bottom of the locator guide, out of contact with the driver. In such a construction an object drawn against the locator in a downward direction, depresses the screw device and driver rigidly positioned with the locator.

The cylindrical locator guide is fixedly restrained to the previously mentioned locator support member and prevented from rotating therearound. This is accomplished by fabricating the locator support member with a recess which closely approximates the outer periphery of the locator guide. The locator guide is then set into position within this recess and thereafter bolted into place so as to eliminate the possibility of rotation of both the locator guide and the locator when a torque force is applied to the locator via the object into which a screw is driven. Thus, torque from the object is absorbed by the entire locator periphery as well as the locator guide which is clamped in place instead of a set screw which often breaks with conventionally cylindrically shaped locators.

In the preferred embodiment of the invention, the locator means further comprises an adjustable depth control device comprising an adjustable screw which protrudes into the interior of locator guide below the position of the lower end of the locator. This adjustable screw thereby limits the downward travel limits of the locator when the spring-loaded locator is urged downwardly into the locator guide.

In order to accomplish imparting a preliminary torque to the screw even before it makes contact with the object into which it is being driven, the preferred embodiment of the invention includes automatic motor activation means to automatically guide and direct the flow of air pressure (to the motor means). As discussed, the automatic screw driving system accomplishes the driving of an inserted screw into an object by the operator's drawing the object downwardly towards the prepositioned screw and driver means after the object is brought into contact with the locator. Thus, the spring-loaded locator, as it is urged downwardly by the operator of the system, brings the object into contact with the screw driven by the motor-powered driver. By placing an air-pressure control means in the locator guide, automatic activation of the driver and thus rotation of the screw can be imparted to the system, thus enabling rotation and torque to be imparted to the screw even before the object comes into contact with the preliminary rotating screw device itself. By placing the air pressure control means proximate to the end of the locator within the locator guide, the downward urging of the spring-loaded locator closes the air pressure control means to in turn direct pneumatic power to rotate the motor means, thereby rotating the driver and the screw device.

In the preferred embodiment of the invention, the closing of the air pressure control means within the locator guide further directs the pneumatic power to an air-piloted valve which in turn directs the pneumatic power to the pneumatic motor. This feature enables the entire system to rely upon a pilot valve having pressure relief means to prevent the build-up of excess pressure and thereby reduce the possibility of valve diaphragm damage, as well as buffering the directed pressure surges to the motor.

Utilizing the inverted pneumatic screw driving system of the type herein disclosed, the method for automatically prepositioning screw devices and for driving these screw devices into objects comprises: (a) positioning the screw devices in the locator in an inverted fashion; (b) aligning the object up to and in contact with the locator at the desired location at which a screw device will be affixed; (c) activating the pneumatically powered driver to rotate the screw device by depressing the locator; (d) depressing the locator further with the object, thereby drawing the screw device on said driver into contact with the object; (e) driving the screw device into the object to the desired depth, and (f) removing the object and the affixed screw device from the automatic screw driver thereby separating the screw head from the screw driving system driver. In the preferred embodiment in which there is provided with the screw driver system, means for automatic activation of the pneulatic motor so as to obtain preliminary rotation of the screw before it makes contact with the object, the method herein described further comprises activation of the pneumatically powered driver automatically, by the simultaneous depression of the locator itself, thereby routing the pneumatic power directly to the motor so as to rotate the driver as well as the screw device attached to the tip of the driver.

DETAILED DESCRIPTION OF THE DRAWINGS

Figures 1, 2:
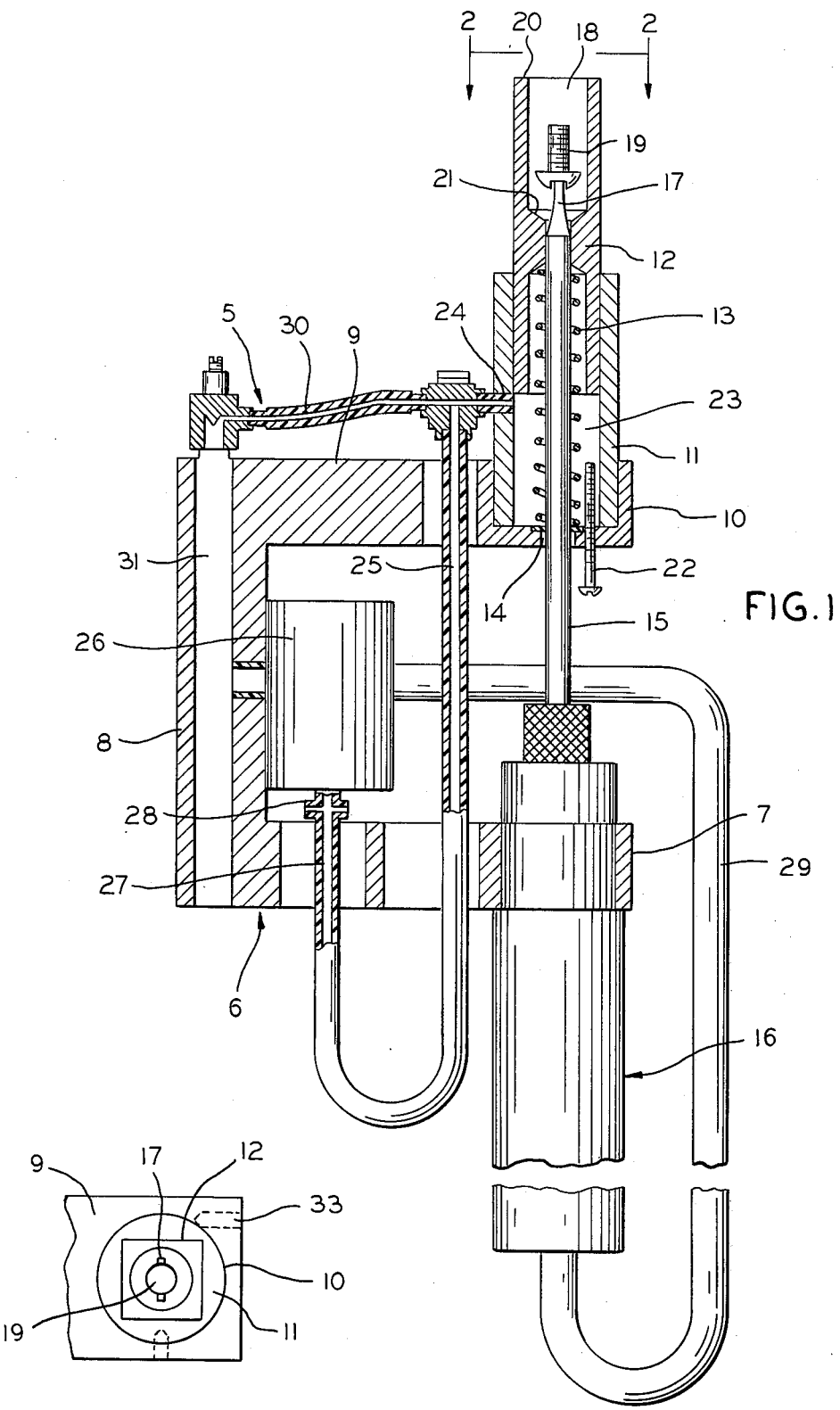
FIG. 1 is a side elevational cross-section view of the screw driving system showing the construction thereof.
FIG. 2 is a top elevational view taken along lines 2—2 and looking in the direction of the arrows of the locator means utilized with the automatic screw-driving system.

While this invention is susceptible of embodiment in many different forms, there is shown in the drawings and will herein be described in detail, one specific embodiment, with the understanding that the present disclosure is to be considered as an exemplification of the principles of the invention and is not intended to limit the invention to the embodiments illustrated.

Automatic screw-driver system 5 is shown in FIG. 1 of the drawings, having substantially "C"-shaped member 6 into which the main components of the system are incorporated. Member 6 comprises motor attachment member 7, mounting member 8, and locator support member 9. Motor means 16 which, in a preferred embodiment comprises a pneumatically powered motor having external torque adjustment clutch features is restrained in place within motor attachment member 7. Driver 15 extends upwardly from motor means 16 towards and through locator support member 9 at aperture 14 and is encompassed by locating means 11 in apertured center 13. Similarly, mounting member 8 has a series of mounting apertures, not shown, for the purpose of enabling attachment of the entire "C"-shaped bracket and thus the screw-driving system to a fixture or work bench.

The locating means associated with the described invention is similarly shown in FIG. 1. Particularly, substantially square-shaped, elongated locator 12 telescopically projects from the substantially cylindrically shaped locator guide 11. The internal periphery of the cavity 23 within locator guide 11 is fabricated to closely approximate the outer periphery of locator 12, thereby enabling locator 12 to emerge from locator guide 11 in a sliding fashion. Additionally, locator 12 is spring-loaded within cavity 23 so as to maintain the upper surface 20 of locator 11 in a position surrounding and protruding above driver tip 17 and inserted screw device 19, both of which are pre-positioned within the locator for subsequent driving of the screw device into an object. The upper end of locator 12 is counter-bored so as to provide operating space for the tip 17 of driver 15. Spring device 13 is seated within the aperture of locator 12 at one end and at its other end within recess 10 of locator member 9. As can be seen the placement of spring device 13 enables the upward telescopic urging of locator 12 relative to locator guide 11 in placement around driver 15 so as to avoid contact with rotating driver 15 when torque is being imparted to it by motor means 16. When an object is brought into position against locator 12 at its surface 20, tip 17 of driver 15 is able to rotate within bore 21 and as the object is urged downwardly, tip 17 and screw device 19 approach the aperture portion 18, end 20 of the locator, and subsequently the position on the object into which screw device 19 is driven.

Adjustable depth control device 22 can be adjusted to any height within locator guide chamber 23, so as to limit the downward movement of spring-loaded locator 12, thereby limiting the extent and length to which screw device 19 is driven into an object by driver 15.

In a preferred embodiment of the invention, the automatic activation means for initiating rotation to screw 19 is incorporated directly into the locator means provided with the automatic screw driver system. Particularly, air pressure control means 24 is located proximate to the end of the locator 12 within locator guide 11, so that the downward urging of the spring-loaded locator 12 closes air pressure control means 24 to in turn direct pneumatic power to rotate motor means 16, thereby rotating driver 15 and screw device 19. In this same preferred embodiment, pneumatic power in the form of air pressure, enters the automatic screw driver system 5 through air channel 31, continues through air channel 30 and is emitted through control valve 24 outwardly through aperture 14 when the locator is not depressed relative to locator guide 11. Upon suppression of spring-loaded locator 12, air pressure control means 24 is blocked, thereby re-routing the air pressure (pneumatic power) through air channel 25, either directly to pneumatic motor 16, or, as shown in the preferred embodiment, air channel 27 and air-piloted valve 26, which in turn directs the air supply through channel 29 to motor means 16. As can be seen, air pilot valve 26 provides the beneficial characteristics of pressure relief means 28 to thereby reduce the possibility of valve diaphragm damage to the automatic screw driving system 5 while buffering the air power surge to motor means 16. Thus, when an object is drawn downwardly against spring-loaded locator 12, air pressure control 24 is blocked and the majority of the air pressure is re-routed to pilot valve 26, and subsequently to motor means 16, thereby initiating rotation of the driver 15 as a function of minute movement of the locator and not as a function of direct contact of screw device 19 with the object into which it will be driven. Through such a construction screw device 19 will have rotation and torque imparted to it within aperture 18 of locator 12 even before screw device 19 reaches surface position 20 on the locator, thereby yielding a preliminary torque to screw device 19 before contact is made with the object.

In FIG. 2 of the drawings an overhead top view of the locator means is shown particularly identifying screw device 19 positioned on driver tip 17 within locator 12 telescoping from locator guide 11. Recess 10 of locator member 9 is similarly shown, particularly identifying typical restraining screw orifice 33 which is utilized to maintain locator guide 11 in place within recess 10. Thus, the square-shaped locator 12 is capable of absorbing a great deal of torque when screw device 19 is being driven into the object in contact with the locator. Absorption of torque continues along its square periphery to locator guide 11 which is securely restrained within recess 10 on the locator member of the "C"-shaped bracket.

Figure 3:
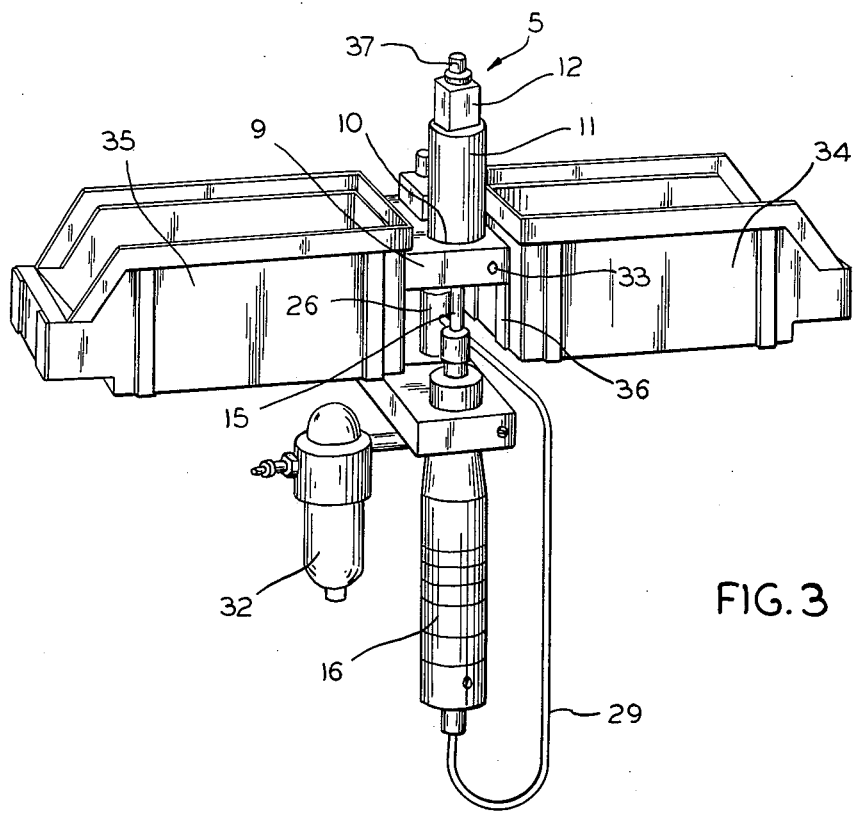
FIG. 3 is a side perspective view of the invention showing particularly the incorporation of parts bins onto the invention.

FIG. 3 of the drawings illustrates the invention in its preferred embodiment utilizing flanged bin attachment means (not shown) on locator member 9 from which parts bins 34 and 35 having gripping means 36 suspend. Similarly, in this particular illustration, object 37 in contact with locator 12 is shown, typifying the manner in which a screw is driven by automatic screw driving system 5 into object 37. Locator guide 11 restrains spring-loaded locator 12 in position so that object 37, being drawn downwardly against locator 12, comes into contact with the screw device driven by motor means 16 through driver 15. Locator guide 11 is maintained in place on locator member 9 within locator recess 10. Screw 33 within locator member 9 assists in restraining locator guide 11 and thus locator 12 from rotating under the presence of torque imparted by pneumatic motor 16. Similarly shown in FIG. 3 are pilot valve 26 and air channel 29 extending from pilot valve 26, directly to motor means 16. Additionally, automatic air powered lubricating device 32 is shown as being integrated into the automatic screw driver system 5.

Figure 4:
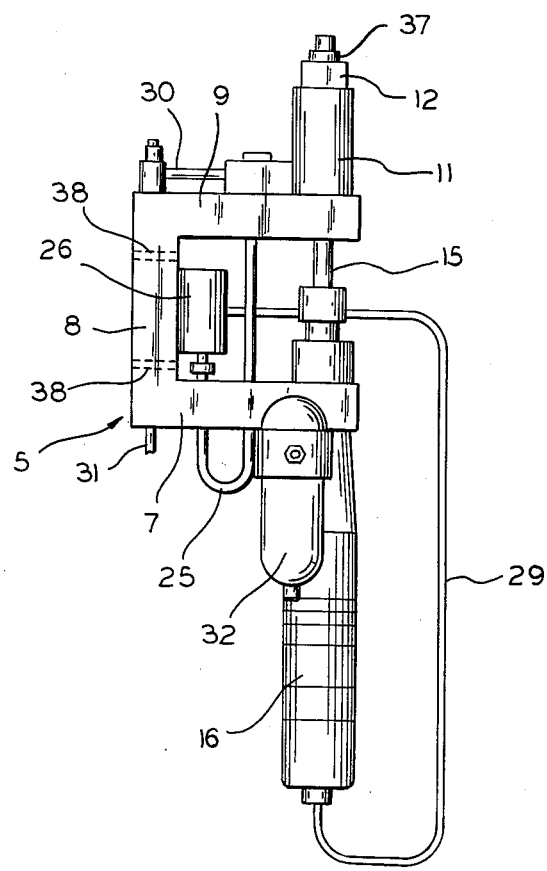
FIG. 4 is a right side elevational view of my invention showing more comprehensively the overall invention cross-sectioned in FIG. 1.

FIG. 4 of the invention again illustrates automatic screw driving system 5 of the invention on which object 37 is urging locator 12 downwardly within locator guide 11. Locator member 9 as well as mounting member 8 and motor member 7 are shown. Mounting member 8 includes mounting apertures 38 through which conventional attachment devices can be inserted to maintain automatic screw driving system 5 in place on a work bench or fixture. Also shown in FIG. 4 are pilot valve 26, air channels 31 and 25, as well as air channels 29 and 30, all of which direct pneumatic power coming into the automatic screw driving system 5 towards activation of motor means 16. Similarly, in this preferred embodiment, automatic lubricating device 32 has been shown.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. An automatic air-operated screw driving system comprising:

air-operated motor means, said air-operated motor means coupled to driver means extending from said motor means to the head of a screw device for driving said screw device into an object;

locator means radially dispersed about said driver means and said screw device;

said locator means having means for distributing the torque applied to said object;

said locator means aligning and fixedly restraining the position of said driver relative to said object;

said locator means preliminarily aligning and maintaining said screw device in position for subsequent contact with and driving into said object;

motor activation means for initiating the rotation of said motor means, said driver means and said screw device for insertion of said screw device into said object.

2. The screw-driving system according to claim 1 in which said invention comprises:

attachment means for attaching said air-operated screw-driving apparatus to a workbench in an inverted position;

said attachment means restraining said motor means and said locator means in a fixed position.

3. An automatic air-operated screw driving system comprising:

air-operated motor means, said air-operated motor means coupled to driver means extending from said motor means to the head of a screw device for driving said screw device into an object;

locator means radially dispersed about said driver means and said screw device;

said locator means having means for distributing the torque applied to said object;

said locator means aligning and fixedly restraining the positions of said driver and said screw device relative to said object;

motor activation means for initiating the rotation of said motor means, said driver means and said screw device for insertion of said screw device into said object; and attachment means for attaching said air-operated screw driving apparatus to a workbench, said attachment means comprising a substantially C-shaped bracket, having a motor attachment member supporting said motor means, a mounting member with mounting apertures for attachment of said bracket to a workpiece, and a locator support member, said attachment means restraining said motor means and said locator means in a fixed position.

4. The invention according to claim 3 in which said attachment means further comprises twin attachment flanges on said locator support member from which parts bins are suspended, thereby bringing said parts into convenience proximity to a user.

5. The invention according to claim 1 in which said motor means comprises a pneumatically powered motor having external torque adjustment clutch means.

6. An automatic air-operated screw driving system comprising:

air-operated motor means, said air-operated motor means coupled to driver means extending from said motor means to the head of a screw device for driving said screw device into an object;

locator means radially dispersed about said driver means and said screw device, said locator means having means for distributing the torque applied to said object;

said locator means aligning and fixedly restraining the positions of said driver and said screw device relative to said objects;

motor activation means for initiating the rotation of said motor means, said driver means and said screw device for insertion of said screw device into said object;

said locator means for distributing the torque applied to said object comprising a substantially square-shaped elongated locator, having an upper and lower end; an apertured center along its elongated axis enabling the passage therethrough of said driver means from the lower end of said apertured center, the tip of said driver means ending within said apertured center, said upper end of said apertured center in said locator being bored to receive the end of said screw device at a position closely proximate to said tip of said driver means;

a substantially cylindrically shaped locator guide telescopically receiving said locator within its internal periphery, said internal periphery having a substantially square shape so as to closely proximate the outer periphery of said locator in a slidingly fashion, locator springing means comprising a coiled spring extending from the interior of said locator guide into a restrained position within said locator thereby urging said locator telescopically upward from said locator guide.

7. The invention according to claim 6 in which said cylindrical locator guide is restrained by said locator support member and prevented from rotating thereon, said locator support member having a recess-shape to closely approximate and receive the outer periphery of said locator guide;

said locator guide being set in position by bolting means after insertion into said recess of said locator support member.

8. The invention according to claim 6 in which said locator means further comprises an adjustable depth control device comprising an adjustable screw protruding into the interior of said locator guide means limiting the downward travel limits of said locator when said spring-loaded locator is urged further into said locator guide;

said depth control limiting the extent to which said screw device can be driven into said object.

9. The invention according to claim 6 in which said motor activation means comprises an automatic activation device comprising an air pressure control means mounted in said locator guide, the placement of said air pressure control means being proximate to the end of said locator within said locator guide such that the downward urging of said spring-loaded locator closes said air pressure control means to in turn direct pneumatic power to rotate said motor means, thereby rotating said driver and said screw device.

10. The invention according to claim 9 in which the closing of said air pressure control means further directs said pneumatic power to an air piloted valve which in turn directs said pneumatic power to said motor means, said air piloted valve having pressure relief means which prevents the build-up of excess pressure thereby reducing the possibilities of valve damage.

11. A method for automatically prepositioning screw devices and for screwing said screw devices into objects through the use of an inverted automatic air-operated screw driving system having a spring-loaded screw device locator, said locator having means for distributing the torque applied to said object, a locator guide, and a pneumatically powered driver and activation system for initiating the rotation of said driver and said screw device comprising the steps of:

a. positioning said screw device in said locator in an inverted fashion,
b. aligning said object up to and in contact with said locator at the desired location of screw device at fixation,
c. preliminarily activating and rotating said pneumatically powered driver for rotation of said screw device by depressing said locator which in turn blocks said pneumatic activation system to route air into said driver;
d. depressing said locator further with said object thereby drawing said screw device into contact with said object;
e. driving said screw device into said object to a desired depth;
f. distributing the torque applied to said object through said locator after driving said screw device into said object to a desired depth;
g. removing said object and affixed screw device from said automatic screw driver thereby separating said screw from said driver.

* * * * *